Sept. 25, 1945.   H. BAADE   2,385,485
POWER STEERING MECHANISM
Filed Sept. 2, 1943   5 Sheets-Sheet 1

INVENTOR
HENRY BAADE
BY

Sept. 25, 1945.  H. BAADE  2,385,485
POWER STEERING MECHANISM
Filed Sept. 2, 1943   5 Sheets-Sheet 3

INVENTOR
HENRY BAADE
BY H. C. Clayton

Sept. 25, 1945.　　　　　H. BAADE　　　　　2,385,485
POWER STEERING MECHANISM
Filed Sept. 2, 1943　　　5 Sheets-Sheet 4
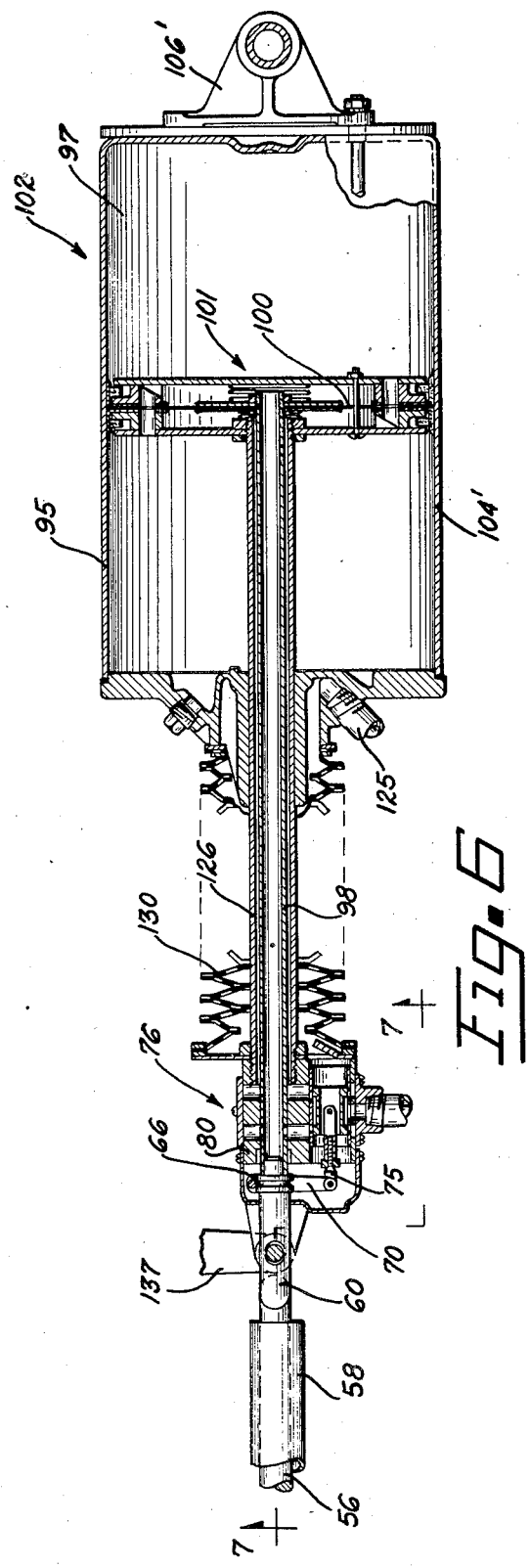
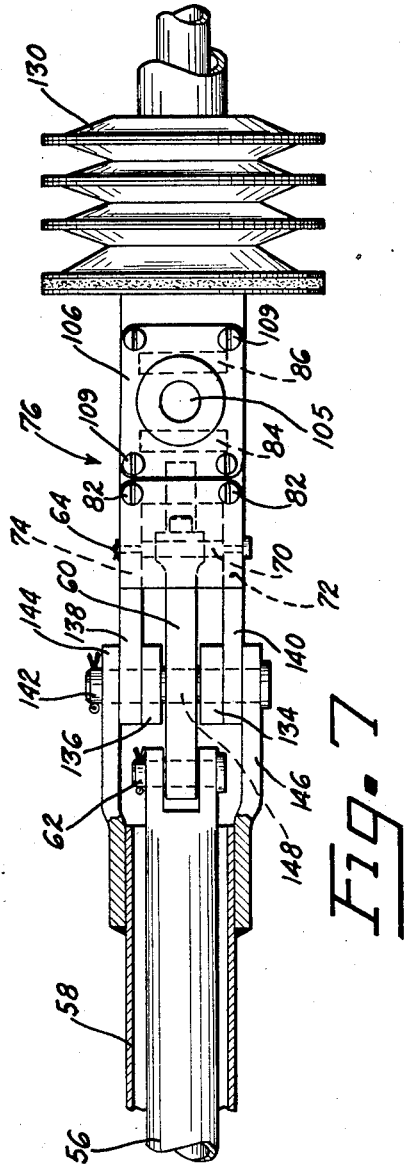
INVENTOR
HENRY BAADE
BY H. O. Clayton

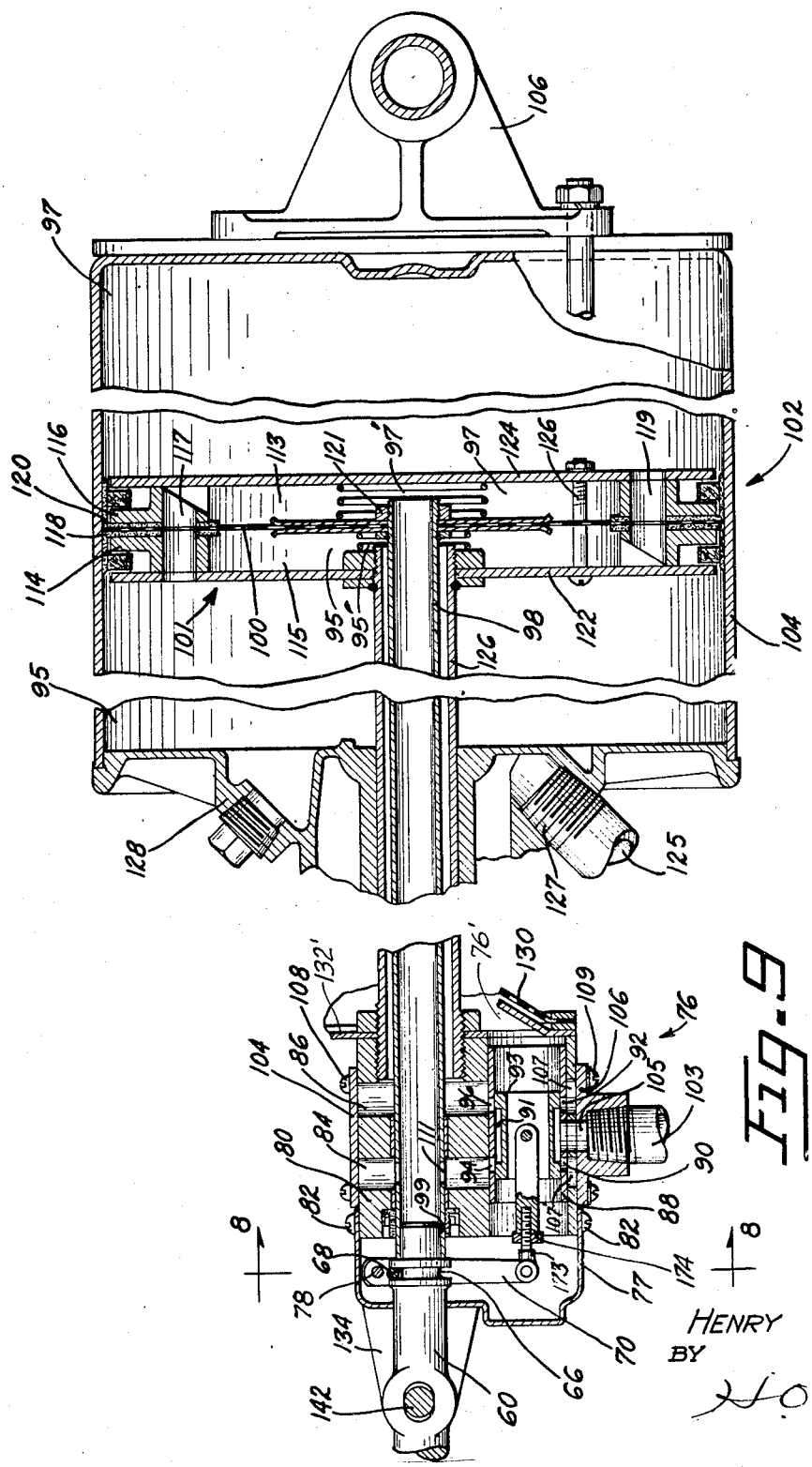

Patented Sept. 25, 1945

2,385,485

UNITED STATES PATENT OFFICE 2,385,485

POWER STEERING MECHANISM

Henry Baade, South Bend, Ind., assignor to Bendix Aviation Corporation, South Bend, Ind., a corporation of Delaware Application September 2, 1943, Serial No. 500,881

8 Claims. (Cl. 180—79.2)

This invention relates to steering mechanism and more particularly to power-operated steering mechanisms adapted for use in connection with vehicles having dirigible wheels.

One of the objects of the present invention is to provide a novel power-operated steering mechanism which is especially adapted for use in connection with motor vehicles.

Another object of the invention is to provide in a motor vehicle steering apparatus a novel construction whereby the operator may readily steer motor vehicles of the larger type, such as trucks or busses, with a minimum amount of effort and at the same time have complete control of the steering of such vehicles as heretofore.

Still another object is to provide a novel power steering mechanism for motor vehicles so constituted as to enable manual control of the steering operation to effect a combined manual and power steering operation.

A further object is to provide in a mechanism of the above character, a novel arrangement of parts whereby manually controlled power operation of the steering apparatus will include a feel or reaction which will be reflected in the manually controlled member in order to simulate as closely as possible the feel or resistance heretofore encountered during manual steering.

Another object of the invention is to provide a pressure differential operated power steering mechanism for motor vehicles controlled by a novel follow-up valve mechanism having two relatively movable valve elements one of said elements being connected, through the intermediary of a lever, to the steering wheel of the vehicle and to the aforementioned means for obtaining the feel or reaction of the mechanism and the other of said elements being connected to the power element of the motor of said mechanism.

A still further object is to provide in a power-operated steering mechanism for motor vehicles, a novel, simple and compact arrangement of parts so constituted as to be relatively light in weight and capable of ready installation without the necessity of completely rebuilding manually-operated steering mechanisms now in common use.

The most important object of my invention however is to provide, in a power steering mechanism, a very simple and compact force transmitting means, including relatively movable juxtaposed members extending parallel to and adjacent the frame of the vehicle, interconnecting the vehicle steering wheel, the drag link of a conventional steering mechanism and the relatively movable parts of a follow-up control valve of said steering mechanism. It is an object of my invention to so construct and arrange the parts of this force transmitting means that the aforementioned follow-up and feel functions of the mechanism are readily effected in the operation of controlling the power steering mechanism constituting my invention.

The above and other novel features of the invention will appear more fully hereinafter from the following detailed description when taken in connection with the accompanying drawings, wherein one embodiment of the invention is illustrated. It is to be expressly understood, however, that the drawings are for purposes of illustration only and are not designed as a definition of the limits of the invention, reference being had for this purpose to the appended claims.

In the drawings, wherein similar reference characters denote similar parts throughout the several views.

Figure 1:
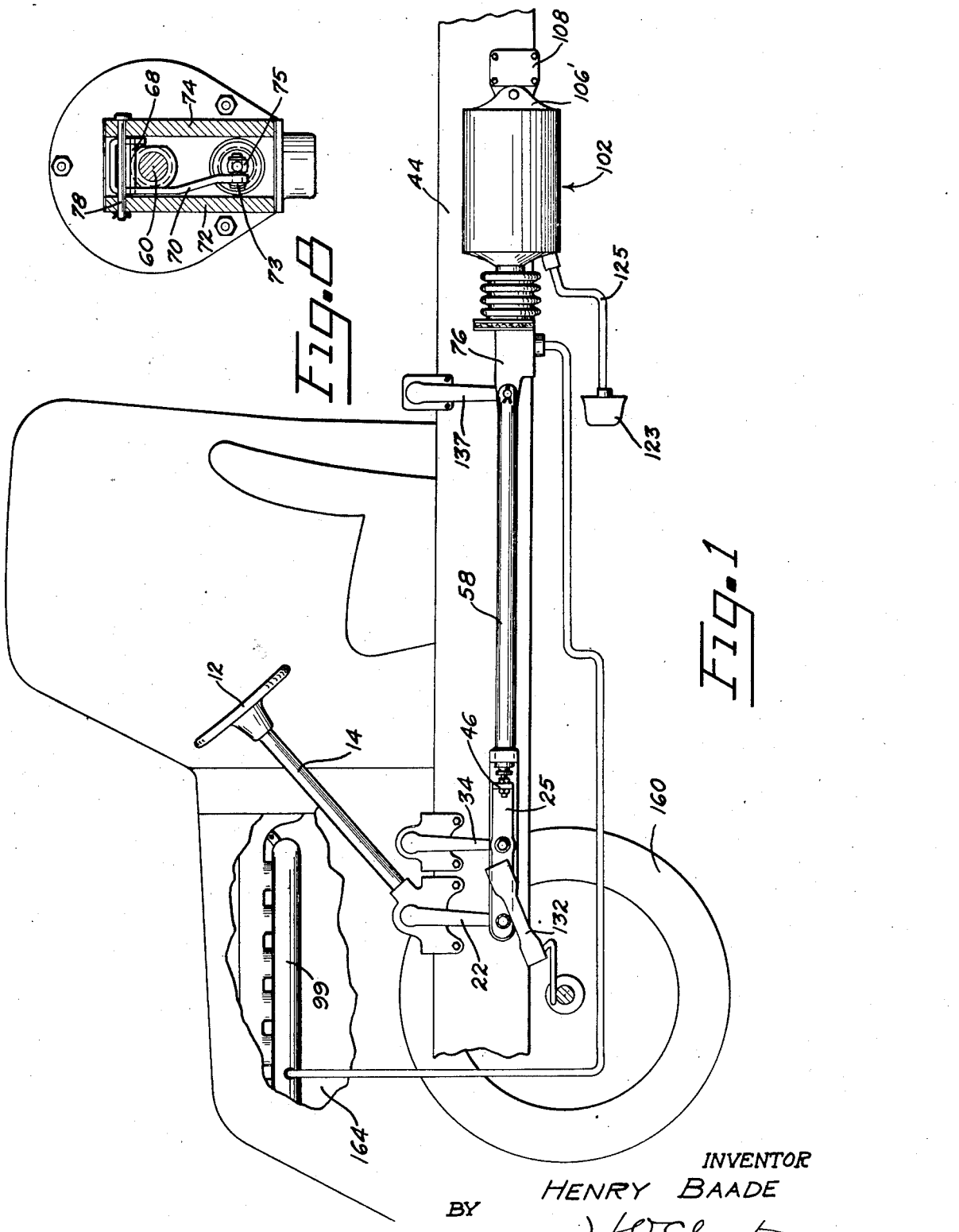
Figure 1 is a side elevational view of a portion of an automotive vehicle disclosing the power steering mechanism constituting my invention.
Figure 2:
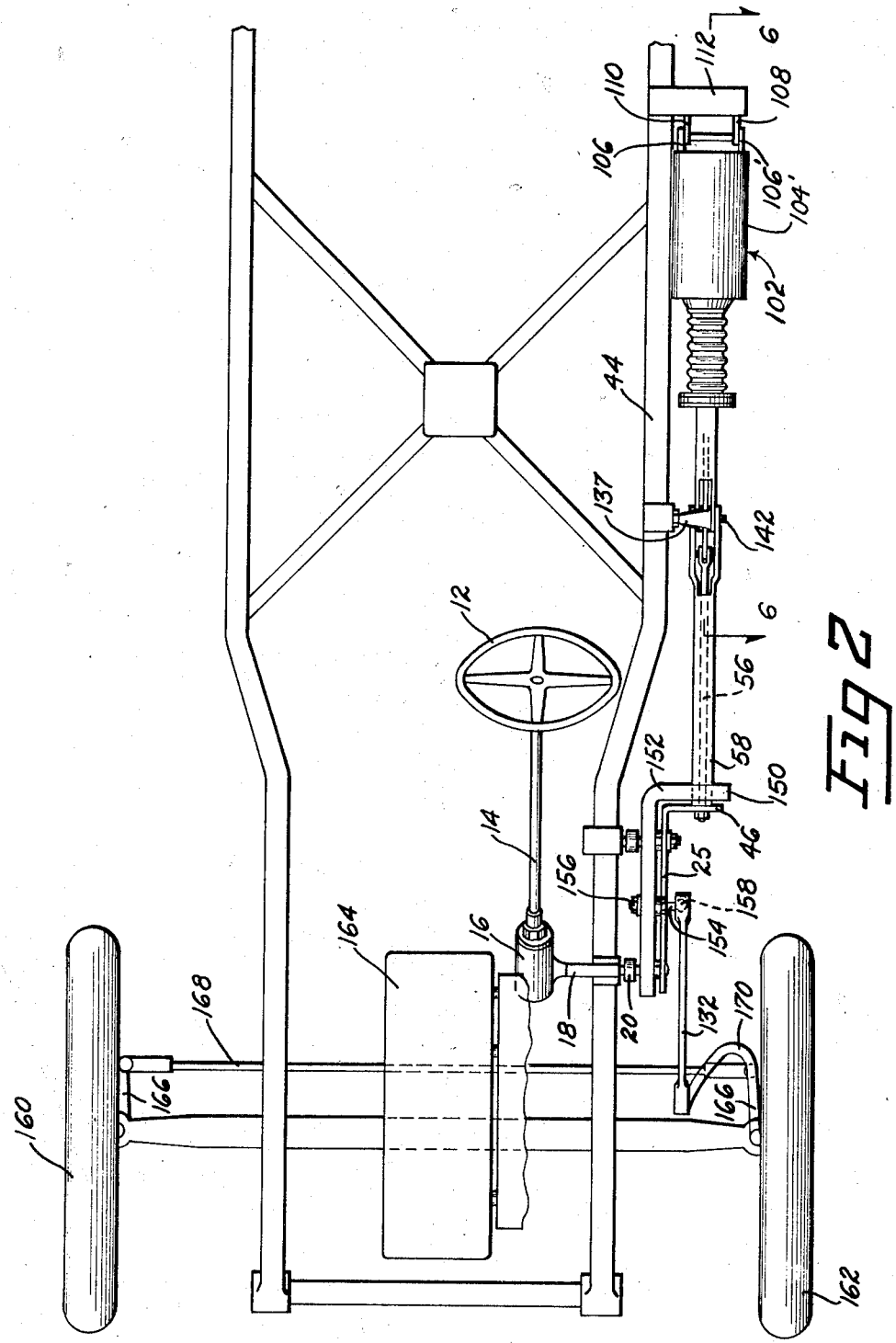
Figure 2 is a plan view of a portion of an automotive vehicle disclosing the power steering mechanism of my invention.
Figure 3:
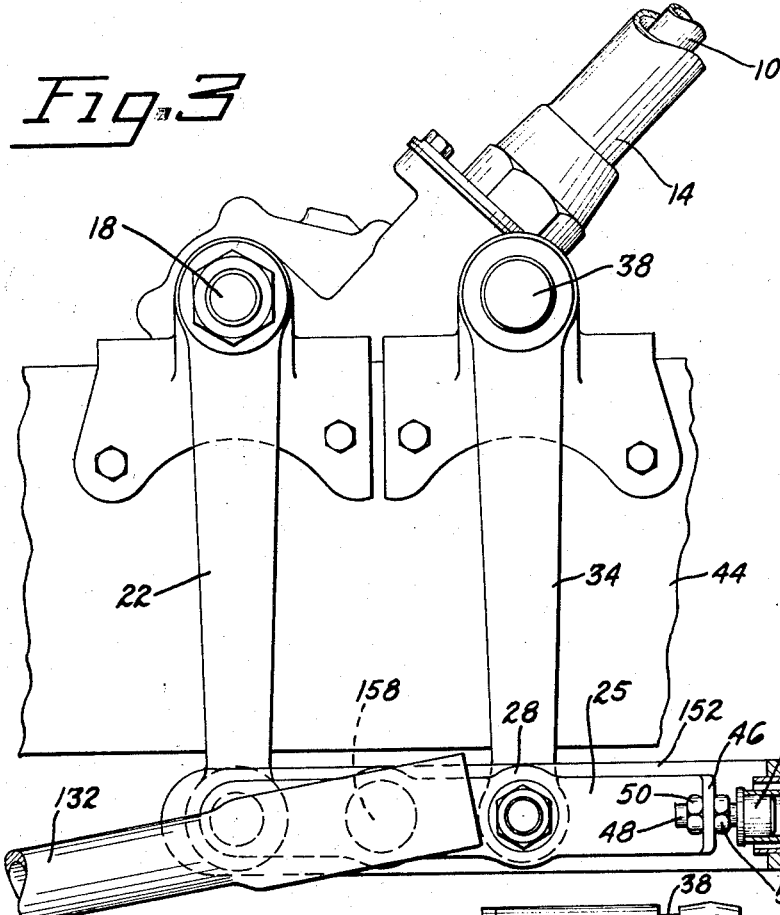
Figure 5:
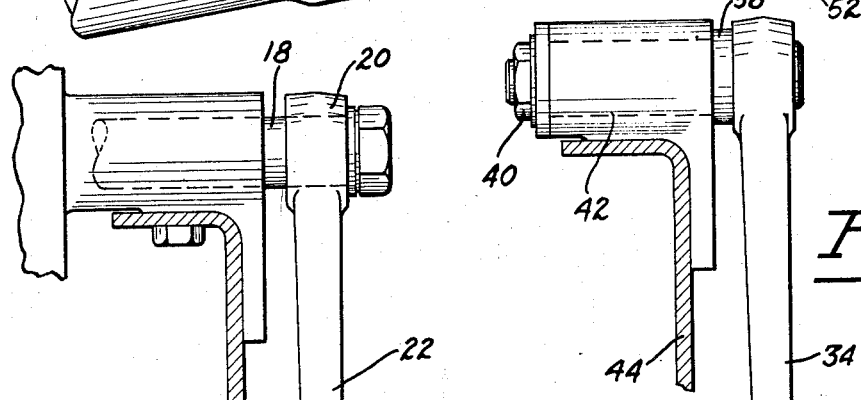
Figure 4:
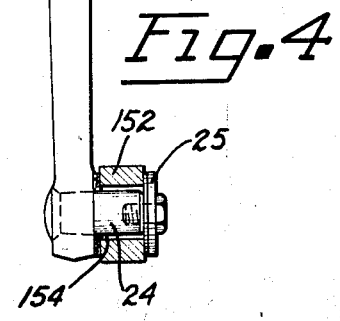

Figure 3 discloses an enlargement of a portion of the power steering mechanism disclosed in Figure 1, said portion including the pitman arm, one of the idler levers and parts connected thereto;

Figure 4 is an end view of the pitman arm and parts connected thereto, all as disclosed in Figure 3;

Figure 5 is an end view of the idler lever and parts connected thereto, all as disclosed in Figure 3;

Figure 6 is a longitudinal sectional view, taken on the line 6—6 of Figure 2 disclosing the pressure differential operated motor and control valve of my invention;

Figure 7 is a view, partly in section and partly in plan, taken on the line 7—7 of Figure 6;

Figure 8 is a sectional view, taken on the line 8—8 of Figure 9, disclosing a part of the valve operating linkage; and Figure 9 is an enlarged sectional view, similar to Figure 6, disclosing details of the pressure differential operated motor and follow up control valve of my invention.

Referring to the drawings the mechanism disclosed therein constituting a preferred embodiment of my invention includes a manually operable steering shaft 10 operated by a steering wheel 12. This shaft, which is housed within a steering post 14, is operable connected by any suitable means, such as a worm and sector unit 16, to a rotatable shaft 18. The shaft 18 extends through and is detachably secured to the end portion 20 of a pitman arm 22. A pin 24, fixedly secured to and extending through the lower end of said pitman arm, serves as a mounting for one end of a strap member 25 which member is preferably provided with an enlarged central portion 28 having an opening 29 therein, circular in outline. Through this opening there extends a reduced portion 30 of a pin 32 extending laterally from the lower end of an idler lever 34. This lever, as disclosed in Figure 5, is preferably fixedly mounted upon the outer end of a pin 38 which extends through and is preferably detachably secured by a nut 40 to a bearing member 42 secured to the frame member 44 of the vehicle.

One end of the strap member 24 is bent laterally outwardly to provide a portion 46 to which is detachably secured a pin 48. This pin 48, which is secured to the portion 46 by nuts 50 and 52, is provided with an enlarged end portion 54 press fitted within one end of a tube 56. This tube, as disclosed in Figures 2, 6 and 7, is housed within a tube 58 and is bifurcated at its end to receive one end of a tubular shaped pin 60 which is pivotally connected to the tube 56 by a pin 62. As disclosed in Figure 8, the end of the pin 60 is shaped to provide an annular groove 66 which groove receives a pin 68. The ends of the pin 68 are mounted within openings in a valve operating lever 70 and this lever, which is preferably U-shaped at its upper end is positioned between the relatively thick side walls 72 and 74 of a cup-like end member 77 of a control unit 76. As disclosed in Figure 8 a pin 73 extends through the end of the lever 70 and through one end of a valve operating pin 75; and the valve operating means also includes a pin 78, said pin being mounted in the side walls 72 and 74 and extending through the U-shaped end of member 70.

Describing now the parts of control valve unit 76, one end of a parallelopipedon 80 is telescoped within the edge portion of the aforementioned member 77 and secured thereto by fastenings 82. The parallelopipedon is provided with slots 84 and 86, Figures 7 and 9, extending therethrough and said member is bored to receive a tubular shaped sleeve member 88 fixedly mounted in the parallelopipedon and having openings 90, 92, 94 and 96 therein; and said member is also bored to receive one end of a tube 98 which is press fitted at 99 over the end of the pin 60 said tube being fixedly secured at its other end to a flexible diaphragm 100 housed within the power element 101 of a pressure differential operated motor 102. As disclosed in Figure 9 rectangular shaped plates 104 and 106, secured to the member 80 by fastenings 108 and 109 respectively, serve to cover the outer ends of said slots thereby providing two pockets within the valve unit. When the parts of the follow up valve 76 are in the position disclosed in Figure 9, that is when said valve is in its closed position to render the power steering mechanism of my invention inoperative, a recess 91 of a spool shaped valve member 93 registers with the ports 90, 92, 94, 96 thereby connecting compartments 95 and 97 of the motor 102 with the intake manifold 99 of the internal combustion engine 164 of the vehicle; accordingly the power mechanism of my invention includes what is known in the art as a vacuum suspended motor. Springs 95¹ and 97¹ may be housed within the motor 102 to bias the ports of the valve to this position; for as will be apparent from an inspection of Figure 9 the valve parts 93 and 88 are operably connected to the diaphragm member 100 and the member 122 respectively and the relative position of said members is determined by the springs 95¹ and 97¹.

Tracing the then existing air transmitting connections between the intake manifold and compartments 95 and 97 the recess 91 is connected with the manifold by an air transmitting conduit 103, a port 105 in the plate 106 and registering ports 107 and 107¹ in the parallelopipedon and sleeve 88 respectively; and the recess 91 in the valve member 93 is connected with the compartment 95 via the ports 90 and 94, slot 84 in the parallelopipedon 80, a port 111 in the tube 98, the interior of said tube, a compartment 113 outlined by the diaphragm 100 and the plate 124 and interconnected openings in the members 100, 114, 116, 118, 120 and 122 providing a duct 117. The recess 91 is connected with the compartment 97 via ports 92 and 96 in the sleeve 88, the slot 86, the interior of the tube 126, a compartment 115 outlined by the diaphragm 100 and the plate 122 and a duct 119 provided by openings in the aforementioned members 100, 114, 116, 118, 120, and 122.

The motor 102 constitutes no part of my invention for as stated above my invention is limited to the construction and arrangement of the parts of the follow up valve disclosed in Figure 9 and the construction and arrangement of the parts of the force transmitting means interconnecting said valve, the steering wheel and the drag link of the steering mechanism.

Briefly describing the motor 102 the same comprises a casing 104′ which, as disclosed in Figure 2, may be pivotally connected by means of bracket members 106, 106¹, 108 and 110 to a support 112 extending laterally from the frame member 44. As disclosed in Figure 9 the power element 101 of the motor 102 preferably comprises rings 114 and 116 angular shaped in cross section, said rings being placed back to back and clamping therebetween two seals 118 and 120 also angular shaped in cross section. Between the latter members there is positioned the flexible diaphragm 100 which is sleeved over and fixedly secured at 121 to the end of the tube 98. The members 100, 114, 116, 118, and 120 are clamped together at their peripheries by plates 122 and 124 suitable fastenings 126 securing the parts together. Plate 122 is fixedly secured at its center to a tubular rod 126 which houses the rod 98 and acting together the plates 122 and 124 constitute the power element of the motor 102. The rod 126 extends through an end plate 128 of the motor 102 and is threadedly connected at its other end with a portion of the parallelopipedon 80; and as disclosed in Figure 6 an expansible and contractable cover member 130 is connected at one of its ends to the end plate 128 and at its other end to a plate 132′ mounted on one end of the valve unit 76. The plate 132′ is provided with an opening 76′ therein, Figures 6 and 9, said opening, together with the aforementioned air transmitting connections with the air cleaner 123, providing means for supplying sufficient air to the interior of the valve housing.

Completing the description of the force transmitting means interconnecting the power element 101 and the drag link 132 of the conventioned steering mechanism, said means includes furcations 134 and 136. Figure 7 at the end of an idler lever 137 pivotally mounted on the frame member 44. These furcations straddle the pin 60 and abut spaced apart ears 138 and 140 extending from the body of the member 77; and through said furcations and ears there extends a pin 142 said pin also extending through spaced apart ears or furcations 144 and 146 extending from the end of the tube 58 and fixedly secured thereto. It is to be noted, as disclosed in Figures 7 and 9, that the pin 142 extends through an opening 148 in the pin 60 which opening is of a diameter such as to make possible a movement of the pin 60 to open the valve, all as will be described hereinafter, without however moving said pin 60 and the parts connected thereto.

As disclosed in Figure 3 the end of the tube 58 is fixedly connected, as by spot welds, to an end portion 150 of a bar 152 said end portion extending at right angles to the body of said bar. As disclosed in Figure 5 the bar 152 is supported by the pin 32 which extends laterally from the movable idler lever 34 and, as disclosed in Figure 4, the end of said bar is provided with an opening 154 through which extends the pin 24 the diameter of said opening being such as to make possible a movement of the strap 25 to crack, that is open, the valve 76 before the bar 152 and the parts connected thereto are moved. As disclosed in Figure 2 the drag link 132 is connected to the bar 152 by a pin 154 extending through said bar and connected thereto by a nut 156; and a ball on the end of the pin 154 fits within a socket in the end of the drag link to provide a conventional ball and socket joint 158.

As disclosed in Figure 2 the drag link 132 constitutes a part of a conventional steering mechanism of an automotive vehicle, said vehicle, as shown in Figures 1 and 2, including steering wheels 160 and 162 and an internal combustion engine 164; and said steering mechanism includes the usual steering arms 166, a tie rod 168 and a curved steering lever 170 connected to the drag link.

Describing now the operation of the power steering mechanism constituting my invention and incidentally completing the description of the parts thereof, when it is desired to turn the front wheels 160 and 162 to effect a right turn of the vehicle the steering wheel 12 is, of course, turned to the right. As will appear from an inspection of Figures 1 and 3 this operation results in a counterclockwise movement of the pitman arm 22 which in turn results in a movement to the right, Figure 9, of the valve member 93 which is pivotally connected to the valve operating lever 70 by adjustably connected links 173 and 174; for when the pitman arm 22 is rotated counterclockwise the strap 25, by virtue of its lost motion connection with the lever 34 and bar 152, is moved to the right thereby moving the tube 56 which is, through the intermediary of the pin 60, connected to the valve operating lever 70.

In this valve cracking operation the lever 70, operating as a lever of the third class, fulcrums on the pin 78; for when the steering wheel is rotated to the right to crack, that is open the valve, the resistance to movement of the parallelopipedon 80, which is connected to the drag link, is great enough to prevent a movement of said member 80 and the pin 78 mounted on the side walls of the end member 77 which is secured to the member 80.

The above described opening of the valve 76, that is the movement to the right of the valve. member 93, results in a venting of the compartment 95 to the atmosphere; for when said valve member is so moved the air flows into the compartment 95 via an air cleaner 123, Figure 1, a conduit 125, a port 127 in the end plate 128 of the motor 102, the interior of the expansible cover member 130, the interior of the valve member 93, the ports 90 and 94 which are then uncovered, the slot 84, the port 111, the interior of the tube 98, the compartment 113 in the motor 102, and the duct 117. The compartment 97 of the motor 102 however remains connected, at this time, with the source of vacuum, that is the intake manifold 99; for when the valve member 93 is moved to the right to effect a right turn operation of the power steering mechanism the ports 92 and 96 remain in registry with the recess 91 which is connected to said manifold.

The compartments 95 and 97 being connected respectively with the atmosphere and a source of vacuum, the piston 101 is then subjected to a differential of pressures resulting in its movement to the right, Figure 9; and this operation, by virtue of the above described connection between the piston 101 and drag link 102; results in a movement of said drag link to the right to effect a right turn steering operation of the vehicle.

It is to be noted at this juncture that at the same time the motor 102 is energized to effect this right turn operation of the steering wheels the driver is conscious of the operation of the motor by virtue of a resistance to movement of the steering wheel to maintain the valve 76 open. This resistance to movement or so-called "feel" results from the differential of pressures to which the diaphragm 100 is at the time subjected, said differential of pressures being the same as that to which the piston 101 is subjected; for it is noted from an inspection of Figure 9 that when the motor 102 is energized to move the power element 101 to the right the compartment 113 of said motor is at the time vented to the atmosphere and the compartment 115 of said motor is connected to the manifold. The diaphragm 100 is accordingly subjected to a differential of pressures tending to move the same to the left, Figure 9, and this differential of pressure provides the desired resistance to movement of the steering wheel.

Describing now the follow up operation of the control valve 76 if the driver should, during the above described operation of the steering mechanism, stop, that is arrest the turning movement of the steering wheel 12 after said valve is open, then the movement of the pin 60 and all parts connected thereto including the pin 68 will of course also be stopped. It is to be remembered however, that at this time the motor 102 is energized and the piston 101 is accordingly in motion. It follows therefore that said piston will continue its movement to the right, Figure 9, until the parallelopipedon 80, which together with the sleeve 88 constitutes one of the two parts of the follow up valve and which is connected to said piston, moves to the right far enough to lap the valve.

Now describing this lapping operation of the valve the member 80 moves to the right, Figure 9, until the ports 90 and 94 in the sleeve 88 are covered by land portions of the valve member 93; and when this happens the flow of air into the compartment 95 is stopped. The movement of the piston 101 then stops inasmuch as the forces acting upon the same are in equilibrium. It is also to be noted here that as the member 80 moves to the right in this follow up to lap operation of the valve the valve member 93 moves to the left thereby completing this operation of the valve in a very short period of time; for when the pin 68 is held stationary, that is when the movement of steering wheel is arrested, and when the member 80 is moved to the right, then the lever 70 functions as a lever of the first class the pin 68 becoming the fulcrum. The resulting clockwise movement of the lever 70 effects the aforementioned leftward movement of the valve member 93 to expedite the lapping operation of the valve, that is expedite the registering of the ports 90 and 94 with the land ports 131 and 133 respectively.

If now the driver desires to effect another increment of turning movement of the wheels 160 and 162, he again turns the steering wheel to the right whereupon the valve 76 is again opened, and this results in the motor 102 being again energized to continue the turning movement of the wheels.

If a left turn operation of the steering wheels is desired the driver will of course turn the steering wheel to the left; and this operation, as will be apparent from the description of the mechanism given above, results in a movement of the valve member 93 to the left, Figure 9, with a resulting power movement of the piston 101 to the left; and this movement of the piston effects a movement of the drag link resulting in a left turn movement of the steering wheels.

There is thus provided a simple and effective power steering mechanism for operating the conventional steering mechanism of an automotive vehicle; for but a limited effort is required to open the valve 76 to thereby initiate an operation of the motor 102 and the driver is, by virtue of the so-called feel, at all times conscious of the force being exerted by power element, that is piston 101 of said motor. If the force exerted by the piston is insufficient to effect the desired steering operation the driver, by taking up the lost motion between the pin 24 and bar 152, Figure 4, or between the portion 28 of the strap 25 and the member 30, Figure 5, or between the pin 60 at the pin 142, Figure 9, whichever is the lesser, may add his physical effort to the force exerted by the motor 102; and, by virtue of the above described follow up action of the valve 76, the driver may effect the turning of the steering wheels in a plurality of increments of movement of the steering wheel.

I claim:

1. In a power steering mechanism for the dirigible wheels of a motor vehicle comprising a frame member extending parallel or substantially parallel to the ground, a pitman arm adapted to be manually oscillated in opposite directions for steering, a drag link, a double ended double acting pressure differential operated motor, a two-part follow up valve for controlling the operation of said motor and mounted adjacent thereto, both parts of said valve being moved to effect said controlling operation, and force transmitting means interconnecting the power element of the motor, the pitman arm, the two parts of the control valve and the drag link, said force transmitting means consisting of a plurality of juxtaposed relatively movable elements extending parallel or substantially parallel to said frame member and further consisting of a lever member connected to both of said valve parts, said member fulcruming at one point when the valve is opened and fulcruming at another point when the valve is lapped.

2. In a power steering mechanism for the dirigible wheels of a motor vehicle comprising a frame member extending parallel or substantially parallel to the ground, a pitman arm mounted on said frame member and adapted to be manually oscillated in opposite directions for steering, a drag link, a double ended double acting pressure differential operated motor mounted on said frame member and extending parallel or substantially parallel thereto, a two-part follow up valve for controlling the operation of said motor and mounted adjacent thereto, both parts of said valve being moved to effect said controlling operation, and force transmitting means interconnecting the power element of the motor, the pitman arm, the two parts of the control valve and the drag link, said force transmitting means consisting of a plurality of juxtaposed relatively movable elements extending parallel or substantially parallel to said frame member and further consisting of a lever member connected to both of said valve parts, said member functioning as a lever of the third class when the valve is opened and functioning as a lever of the first class when the follow-up to lap operation of the valve is effected.

3. In a power steering mechanism for the dirigible wheels of a motor vehicle comprising a frame member extending parallel or substantially parallel to the ground, a pitman arm mounted on said frame member and adapted to be manually oscillated in opposite directions for steering, a drag link, a double ended double acting pressure differential operated motor mounted on said frame member and extending parallel or substantially parallel thereto, a two-part follow up valve including a parallelopipedon body member and a spool shaped member reciprocably mounted therein for controlling the operation of said motor and mounted adjacent thereto, both parts of said valve being moved to effect said controlling operation, and force transmitting means, including means interconnecting the parallelopipedon and power element of the motor and means interconnecting the pitman arm and spool shaped member, interconnecting the power element of the motor, the pitman arm, the two parts of the control valve and the drag link, said force transmitting means consisting of a plurality of juxtaposed relatively movable elements extending parallel or substantially parallel to said frame member.

4. In an automotive vehicle having a frame, a power steering mechanism for operating the dirigible wheels of the vehicle, said mechanism including a manually operable pitman arm, two spaced idler levers mounted on the frame of the vehicle, a drag link connected to said dirigible wheels and means for actuating said drag link to effect the steering operation, said means comprising a double acting double ended pressure differential operated motor including a power element, a follow up valve mounted exterior to said motor for controlling the operation thereof and force transmitting means interconnecting the drag link, pitman arm, idler levers, follow up valve and power element of the motor, said force transmitting means including a plurality of juxtaposed relatively movable elements extending parallel or substantially parallel to the frame of the vehicle, two of said elements being positioned side by side, two of said elements being telescoped one within the other and lying outside said motor and two of said elements being telescoped one within the other and having parts thereof lying within said motor.

5. In an automotive vehicle provided with a steering wheel and a drag link, a power steering mechanism for moving said drag link to steer the vehicle, said power steering mechanism comprising a manually operable pitman arm, a double acting pressure differential motor having housed therein a power element and a diaphragm, said diaphragm comprising part of means for effecting a resistance to the rotation of the steering wheel during the operation of the power steering mechanism, a two-part follow up valve for controlling the operation of said motor one of the valve parts constituting a spool shaped member and the other of said members constituting a parallelopipedon having an opening therein to receive said spool shaped valve member and force transmitting means interconnecting the diaphragm, the power element of the motor, the pitman arm, the drag link, the steering wheel and the two valve parts, said force transmitting means comprising a valve operating lever, means secured to one of the valve parts and constituting a part of the mounting for said lever and means interconnecting the said lever with the diaphragm and power element, said latter means comprising a pair of elements one telescoped within the other.

6. In an automotive vehicle provided with a steering wheel and a drag link, a power steering mechanism for moving said drag link to steer the vehicle, said power steering mechanism comprising a manually operable pitman arm, a double acting pressure differential motor having housed therein a power element and a diaphragm, said diaphragm comprising part of means for effecting a resistance to the rotation of the steering wheel during the operation of the power steering mechanism, a two-part follow up valve for controlling the operation of said motor, one of the valve parts constituting a spool shaped member and the other of said members constituting a parallelopipedon having an opening therein to receive said spool shaped valve member and force transmitting means interconnecting the diaphragm, the power element of the motor, the pitman arm, the drag link, the steering wheel and the two valve parts, said force transmitting means comprising a valve operating lever member, means interconnecting one end of said member with the spool shaped member, means interconnecting the parallelopipedon with the lever member and means interconnecting the diaphragm with the lever member.

7. In a power steering mechanism for the dirigible wheels of an automotive vehicle comprising a frame member extending parallel or substantially parallel to the ground, a steering wheel, a pitman arm mounted on said frame member and adapted to be manually oscillated in opposite directions for steering, a drag link, a double-ended double-acting pressure differential operated motor mounted on said frame member and having housed therein a power element and a diaphragm, said diaphragm comprising part of means for effecting a resistance to the rotation of the steering wheel during the operation of the power steering mechanism, a two part follow-up valve for controlling the operation of said motor and mounted adjacent thereto, both parts of said valve being moved to effect said controlling operation, and force transmitting means interconnecting the power element of the motor, the diaphragm, the pitman arm, the two parts of the control valve and the drag link said force transmitting means comprising a lever member and further comprising a plurality of juxtaposed relatively movable elements extending parallel or substantially parallel to said frame member.

8. In a power steering mechanism for the dirigible wheels of a motor vehicle comprising a frame member extending parallel or substantially parallel to the ground, a pitman arm adapted to be manually oscillated in opposite directions for steering, a drag link, a double acting pressure differential operated motor, a two-part follow up valve for controlling the operation of said motor and mounted adjacent thereto, both parts of said valve being movable to effect said controlling operation, and force transmitting means interconnecting the power element of the motor, the pitman arm, the two parts of the control valve and the drag link, said force transmitting means consisting of a plurality of juxtaposed relatively movable elements and further consisting of a lever member connected to both of said valve parts, said member fulcruming at one point when the valve is opened and fulcruming at another point when the valve is lapped.

HENRY BAADE.